(12) United States Patent
Freer

(10) Patent No.: US 12,365,469 B2
(45) Date of Patent: *Jul. 22, 2025

(54) AIRCRAFT PROPULSION SYSTEM WITH INTERMITTENT COMBUSTION ENGINE(S)

(71) Applicant: Pratt & Whitney Canada Corp., Longueuil (CA)

(72) Inventor: Richard Freer, Saint-Basile-le-Grand (CA)

(73) Assignee: Pratt & Whitney Canada Corp., Longueuil (CA)

( * ) Notice: Subject to any disclaimer, the term of this patent is extended or adjusted under 35 U.S.C. 154(b) by 238 days.

This patent is subject to a terminal disclaimer.

(21) Appl. No.: 17/866,081

(22) Filed: Jul. 15, 2022

(65) Prior Publication Data

US 2024/0017842 A1 Jan. 18, 2024

(51) Int. Cl.
*B64D 27/04* (2006.01)
*B64D 35/06* (2006.01)
(Continued)

(52) U.S. Cl.
CPC .............. *B64D 27/04* (2013.01); *B64D 35/06* (2013.01); *F02B 41/10* (2013.01); *F02C 6/12* (2013.01); *F02B 37/00* (2013.01)

(58) Field of Classification Search
CPC ........ B64D 35/00; B64D 35/02; B64D 35/04; B64D 35/06; B64D 27/08; B64D 29/00;
(Continued)

(56) References Cited

U.S. PATENT DOCUMENTS 2,395,610 A * 2/1946 Cavallaro .............. B64D 35/04
74/665 K
2,466,949 A * 4/1949 Highberg ................ F16D 67/00
475/50
(Continued)

FOREIGN PATENT DOCUMENTS

CA 2602214 A1 3/2009
CA 3055846 A1 4/2020
(Continued)

OTHER PUBLICATIONS

Strack et al. "Technology and benefits of aircraft counter rotation propellers." NASA Technical Memorandum. Oct. 1982. (Year: 1982).*

(Continued)

*Primary Examiner* — Joshua J Michener
*Assistant Examiner* — Ka Chun Leung
(74) *Attorney, Agent, or Firm* — Getz Balich LLC

(57) ABSTRACT

An aircraft system is provided that includes a first propulsor rotor, a first transmission, a second propulsor rotor, a second transmission and an intermittent combustion engine. The first propulsor rotor is rotatable about a first propulsor axis. The first transmission is coupled to the first propulsor rotor. The second propulsor rotor is rotatable about a second propulsor axis. The second transmission is coupled to the second propulsor rotor. The intermittent combustion engine is configured to drive rotation of the first propulsor rotor through the first transmission. The intermittent combustion engine is configured to drive rotation of the second propulsor rotor through the second transmission.

19 Claims, 9 Drawing Sheets

(51) Int. Cl.
*F02B 41/10* (2006.01)
*F02C 6/12* (2006.01)
*F02B 37/00* (2006.01)

(58) Field of Classification Search
CPC ............ B64D 29/04; B64D 2033/0226; B64D 2033/028; B64D 33/04; B64C 11/48
See application file for complete search history.

(56) References Cited

U.S. PATENT DOCUMENTS

| | | | |
|---|---|---|---|
| 2,961,189 A | 11/1960 | Doak | |
| 3,106,369 A | 10/1963 | Borst | |
| 3,335,977 A | 8/1967 | Meditz | |
| 4,964,315 A * | 10/1990 | Willis, Jr. | ................. F16H 1/22 74/665 K |
| 5,890,441 A | 4/1999 | Swinson | |
| 7,188,802 B2 | 3/2007 | Magre | |
| 8,256,709 B2 | 9/2012 | Negulescu | |
| 9,540,113 B2 | 1/2017 | Gukeisen | |
| 9,650,954 B2 | 5/2017 | Suciu | |
| 10,352,274 B2 | 7/2019 | Suciu | |
| 10,823,041 B2 | 11/2020 | Dionne | |
| 10,830,129 B2 | 11/2020 | Lord | |
| 10,894,605 B2 | 1/2021 | Hines | |
| 11,719,166 B1 | 8/2023 | Freer | |
| 2002/0104919 A1 * | 8/2002 | Geranio | ................. B64C 27/20 244/2 |
| 2012/0128487 A1 | 5/2012 | Eames | |
| 2017/0253331 A1 * | 9/2017 | Nakashima | ............ B64U 50/39 |
| 2019/0186334 A1 | 6/2019 | Dionne | |
| 2019/0283888 A1 | 9/2019 | Hines | |
| 2019/0344877 A1 | 11/2019 | Gilliland | |
| 2020/0108915 A1 * | 4/2020 | Thomassin | ............ F02B 33/40 |
| 2020/0216182 A1 | 7/2020 | Negulescu | |
| 2021/0309059 A1 | 10/2021 | Ker | |
| 2021/0371116 A1 | 12/2021 | Cartwright | |
| 2023/0138513 A1 * | 5/2023 | Ribeiro | .................. B64D 35/04 244/53 R |
| 2024/0017841 A1 * | 1/2024 | Freer | ..................... B64D 27/10 |
| 2024/0017842 A1 | 1/2024 | Freer | |

FOREIGN PATENT DOCUMENTS

| | | | | |
|---|---|---|---|---|
| DE | 102019208353 A1 | 12/2020 | | |
| EP | 3128153 B1 | 2/2019 | | |
| FR | 3042007 | * | 4/2017 | ............... F16H 1/20 |

OTHER PUBLICATIONS

Airplane Flying Handbook, FAA-H-8083-3A, U.S. Department of Transportation, Federal Aviation Administration (FAA), 2004, pp. 15-1 to 15-24 (Year:2004).

EP Search Report for EP Patent Application No. 23185410.0 dated Jul. 12, 2024.

* cited by examiner

AIRCRAFT PROPULSION SYSTEM WITH INTERMITTENT COMBUSTION ENGINE(S)

TECHNICAL FIELD

This disclosure relates generally to an aircraft and, more particularly, to a propulsion system for the aircraft.

BACKGROUND INFORMATION

An aircraft such as a business jet may fly at relatively high altitudes to reduce aircraft drag and may fly at relatively fast speeds to decrease flight time. Engine power and engine efficiency at high altitudes therefore is a relatively important factor when selecting a propulsion system engine for a business jet. A typical business jet includes one or more small gas turbine engines for generating aircraft propulsion. While such small gas turbine engines have various benefits, there is still room in the art for improvement. There is a need in the art, in particular, for more cost effective and/or fuel efficient propulsion system configurations for aircraft such as a business jet.

SUMMARY

According to an aspect of the present disclosure, an aircraft system is provided that includes a first propulsor rotor, a first transmission, a second propulsor rotor, a second transmission and an intermittent combustion engine. The first propulsor rotor is rotatable about a first propulsor axis. The first transmission is coupled to the first propulsor rotor. The second propulsor rotor is rotatable about a second propulsor axis. The second transmission is coupled to the second propulsor rotor. The intermittent combustion engine is configured to drive rotation of the first propulsor rotor through the first transmission. The intermittent combustion engine is configured to drive rotation of the second propulsor rotor through the second transmission.

According to another aspect of the present disclosure, another aircraft system is provided that includes a first propulsor, a first transmission, a second propulsor, a second transmission and an intermittent combustion engine. The first propulsor includes a plurality of first propulsor rotors rotatable about a first propulsor axis. The first transmission is coupled to the plurality of first propulsor rotors. The second propulsor includes a plurality of second propulsor rotors rotatable about a second propulsor axis. The second transmission is coupled to the plurality of second propulsor rotors. The intermittent combustion engine is configured to drive rotation of the plurality of first propulsor rotors through the first transmission and in opposing directions. The intermittent combustion engine is configured to drive rotation of the plurality of second propulsor rotors through the second transmission and in opposing directions.

According to still another aspect of the present disclosure, another aircraft system is provided that includes an aircraft fuselage, a propulsor, a transmission and a turbo-compounded intermittent combustion engine. The propulsor is outside of and next to the aircraft fuselage. The propulsor is configured as or otherwise includes a ducted propulsor rotor. The transmission is housed within the aircraft fuselage. The transmission is coupled to the propulsor. The turbo-compounded intermittent combustion engine is housed within the aircraft fuselage. The turbo-compounded intermittent combustion engine is configured to drive rotation of the ducted propulsor rotor through the transmission.

The first transmission may be configured as a first variable speed transmission. The second transmission may be configured as a second variable speed transmission.

During at least one mode of operation, the first transmission and the second transmission may be configured to facilitate rotation of the first propulsor rotor and the second propulsor rotor at a common rotational speed.

During at least one mode of operation, the first transmission and the second transmission may be configured to facilitate rotation of the first propulsor rotor and the second propulsor rotor at different rotational speeds.

The first propulsor rotor may be configured as or otherwise include a first ducted rotor. The second propulsor rotor may be configured as or otherwise include a second ducted rotor.

The first propulsor rotor may be configured as or otherwise include a first open rotor. The second propulsor rotor may be configured as or otherwise include a second open rotor.

The first propulsor axis may be laterally spaced from the second propulsor axis. The intermittent combustion engine may be located laterally between the first propulsor axis and the second propulsor axis.

The aircraft system may also include a third propulsor rotor downstream of the first propulsor rotor and rotatable about the first propulsor axis. The intermittent combustion engine may be configured to drive rotation of the third propulsor rotor through the first transmission.

The aircraft system may also include a first propulsor ring gear, a third propulsor ring gear and a pinion gear. The first propulsor ring gear may be rotatable with the first propulsor rotor. The third propulsor ring gear may be rotatable with the third propulsor rotor. The pinion gear may be rotatably driven by the intermittent combustion engine through the first transmission. The pinion gear may be meshed with the first propulsor ring gear and the third propulsor ring gear.

The aircraft system may also include a first propulsor ring gear, a third propulsor ring gear, a first pinion gear and a second pinion gear. The first propulsor ring gear may be rotatable with the first propulsor rotor. The third propulsor ring gear may be rotatable with the third propulsor rotor. The first pinion gear may be rotatably driven by the intermittent combustion engine through the first transmission. The first pinion gear may be meshed with the first propulsor ring gear. The second pinion gear may be rotatably driven by the intermittent combustion engine through the first transmission. The second pinion gear may be meshed with the third propulsor ring gear.

The aircraft system may also include a drivetrain coupling the intermittent combustion engine to the first propulsor rotor and the third propulsor rotor. The drivetrain may be configured to rotate the first propulsor rotor and the third propulsor rotor in opposite directions. The drivetrain may include the first transmission.

The aircraft system may also include a first drive structure and a first coupling. The first drive structure may couple the first transmission to the first propulsor rotor. The first coupling may connect the drive structure to the first propulsor rotor. The first coupling may include a first propulsor ring gear and a first pinion gear. The first propulsor ring gear may be rotatable with the first propulsor rotor. The first pinion gear may be rotatable with the drive structure and meshed with the first ring gear.

The drive structure may be configured as a driveshaft.

The first transmission may be configured as or otherwise include a variable speed transmission.

The intermittent combustion engine may be configured as or otherwise include a rotary engine, a piston engine, a rotating detonation engine or a pulse detonation engine.

The intermittent combustion engine may be configured as or otherwise include a turbo-compounded intermittent combustion engine or a turbocharged intermittent combustion engine.

The aircraft system may also include an aircraft fuselage housing the intermittent combustion engine, the first transmission and the second transmission. The first propulsor rotor and the second propulsor rotor may be located outside of the aircraft fuselage.

The aircraft system may also include an inlet and an exhaust. The inlet may be configured to direct boundary layer air flowing along the aircraft fuselage to the intermittent combustion engine. The exhaust may be located at an aft end of the aircraft fuselage. The exhaust may be configured to direct combustion products generated by the intermittent combustion engine out of the aircraft system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
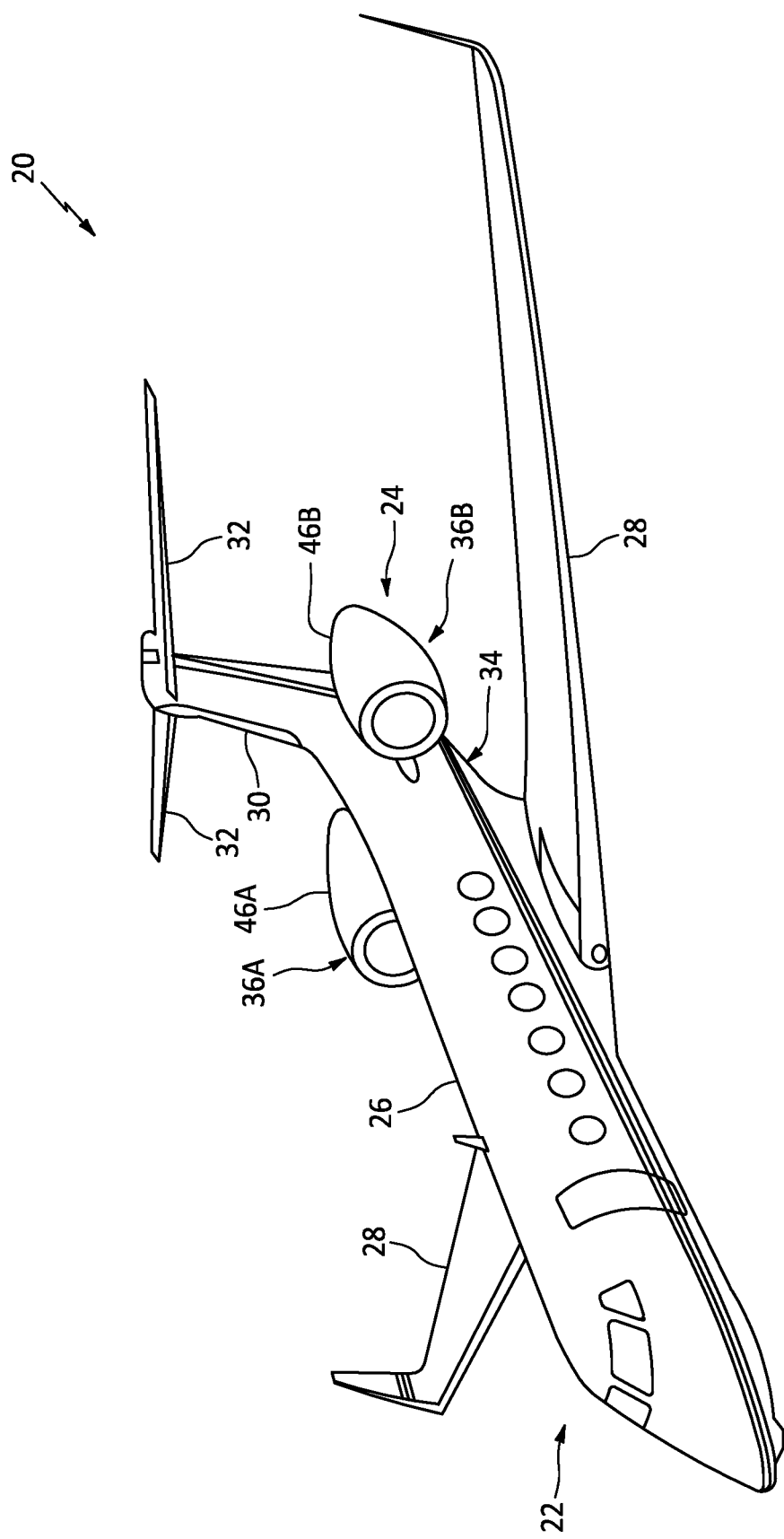
FIG. 1 is a perspective illustration of an aircraft.

FIG. 1 illustrates an aircraft 20 configured as an airplane such as, but not limited to, a business jet. This aircraft 20 includes an aircraft airframe 22 and an aircraft propulsion system 24. The airframe 22 of FIG. 1 includes an aircraft fuselage 26, a plurality of aircraft wings 28, an aircraft vertical stabilizer 30 and a plurality of aircraft horizontal stabilizers 32.

Figure 2:
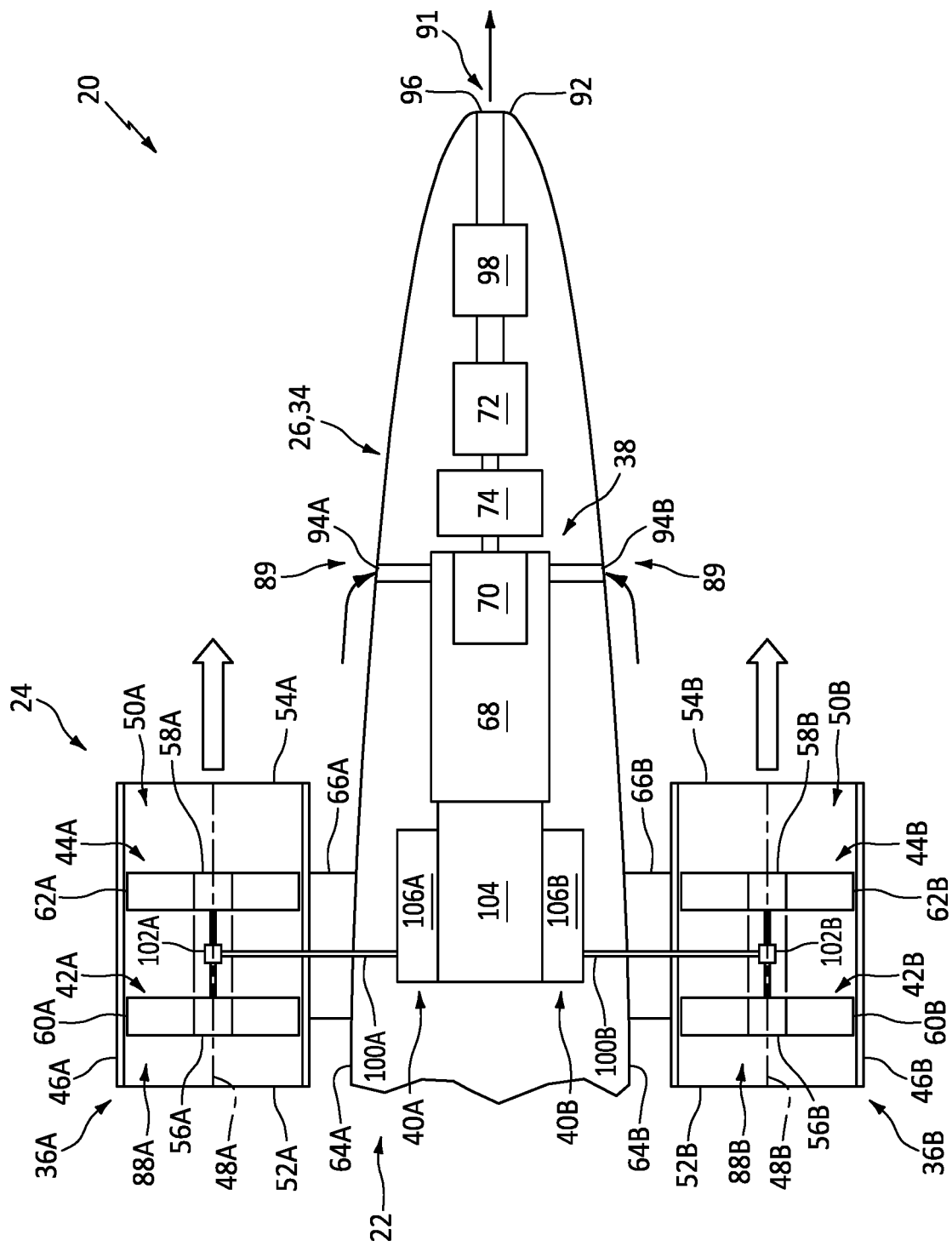
FIG. 2 is a schematic illustration of an aft end portion of the aircraft configured with a propulsion system.

The propulsion system 24 is mounted with the airframe 22 and configured to generate (e.g., horizontal) thrust for propelling the aircraft 20 forward during forward aircraft flight. The propulsion system 24 may be located at an aft end region 34 of the fuselage 26 near the vertical stabilizer 30; however, the present disclosure is not limited to such an exemplary aircraft propulsion system location. Referring to FIG. 2, the propulsion system 24 includes one or more aircraft propulsors 36 (e.g., 36A and 36B), an aircraft powerplant 38 and one or more propulsor drivetrains 40 (e.g., 40A and 40B) for transferring mechanical power from the powerplant 38 to the aircraft propulsors 36.

Each of the aircraft propulsors 36A, 36B is configured as a discrete propulsion unit; e.g., a module, pod, etc. Each of the aircraft propulsors 36A, 36B of FIG. 2, for example, includes one or more bladed propulsor rotors 42 (e.g., 42A, 42B) and 44 (e.g., 44A, 44B) and a propulsor housing 46 (e.g., 46A, 46B), which propulsor housing 46 may include a propulsor case and a propulsor nacelle. The propulsor rotors 42 and 44 are rotatable about a respective axis 48 (e.g., 48A, 48B) of the aircraft propulsor 36. The propulsor rotors 42 and 44 of FIG. 2 are configured as ducted rotors; e.g., counter-rotating fan rotors. Each of the propulsor rotors 42 and 44 of FIG. 2, more particularly, is arranged within an internal flow duct 50 (e.g., 50A, 50B) of the propulsor housing 46. This flow duct 50 extends longitudinally (e.g., axially along the respective propulsor axis 48) through the propulsor housing 46 between and to an inlet 52 (e.g., 52A, 52B) to the aircraft propulsor 36 and an exhaust 54 (e.g., 54A, 54B) from the aircraft propulsor 36. Each of the propulsor rotors 42 and 44 includes a rotor disk 56 (e.g., 56A, 56B), 58 (e.g., 58A, 58B) and a plurality of rotor blades 60 (e.g., 60A, 60B), 62 (e.g., 62A, 62B); e.g., fan blades. The rotor blades 60, 62 are distributed circumferentially about the respective rotor disk 56, 58 in an annular array. Each of the rotor blades 60, 62 is connected to the respective rotor disk 56, 58. Each of the rotor blades 60, 62, for example, may be formed integral with or mechanically fastened, welded, brazed, adhered and/or otherwise attached to the respective rotor disk 56, 58. The rotor blades 60, 62 may be stationary rotor blades. Alternatively, one or more or all of the rotor blades 60, 62 of the respective propulsor rotor 42, 44 may be variable pitch rotor blades.

In some embodiments, the first (e.g., upstream) propulsor rotor 42 and the second (e.g., downstream) propulsor rotor 44 may have common dimensions; e.g., the same diameters. In other embodiments, the first and the second propulsor rotors 42 and 44 may have different dimensions.

The first propulsor rotor 42 is disposed forward and upstream of the second propulsor rotor 44 along the respective propulsor axis 48. The first propulsor rotor 42 is configured to rotate in a first (e.g., clockwise, or counter-clockwise) direction about the respective propulsor axis 48. The second propulsor rotor 44 is configured to rotate in a second (e.g., counterclockwise, or clockwise) direction about the respective propulsor axis 48, which second direction is opposite the first direction. Of course, it is contemplated the first propulsor rotor 42 and the second propulsor rotor 44 may rotate in a common (the same) direction about the respective propulsor axis 48 where, for example, the aircraft propulsor 36 also includes one or more vane arrays (not shown) within the flow duct 50.

Each of the aircraft propulsors 36 is arranged outside of the airframe 22 and its fuselage 26. The first aircraft propulsor 36A of FIG. 2, for example, is located on and mounted to a lateral first side 64A of the fuselage 26 by a first pylon 66A. The second aircraft propulsor 36B of FIG. 2 is located on and mounted to a lateral second side 64B of the fuselage 26 by a second pylon 66B, which second side 64B is laterally opposite the first side 64A. With this arrangement, the airframe 22 and its fuselage 26 are located laterally between the first aircraft propulsor 36A and the second aircraft propulsor 36B.

The aircraft powerplant 38 may be configured as or otherwise include an intermittent combustion engine 68, which may also be referred to as an intermittent internal combustion (IC) engine. The term "intermittent combustion engine" may describe an internal combustion engine in which a mixture of fuel and air is intermittently (e.g., periodically) detonated within the engine. Examples of the intermittent combustion engine 68 include, but are not limited to, a reciprocating piston engine (e.g., an inline (I) engine, a V-engine, a W-engine, etc.), a rotary engine (e.g., a Wankel engine), a rotating detonation engine and a pulse detonation engine. By contrast, the term "continuous combustion engine" may describe an internal combustion engine in which a mixture of fuel and air is continuously (e.g., steadily) detonated. An example of a continuous combustion engine is a gas turbine engine. While continuous combustion engines have various benefits, the intermittent combustion engine 68 may be less expensive to manufacture and service than a comparable continuous combustion gas turbine engine. The intermittent combustion engine 68 may also or alternatively be more fuel efficient than a comparable continuous combustion gas turbine engine.

To facilitate aircraft operation at relatively high altitudes (e.g., above 10,000 ft), the intermittent combustion engine 68 may be configured as a forced induction intermittent combustion engine. The intermittent combustion engine 68, for example, may be turbo-compounded (e.g., see FIG. 3) and/or turbocharged (e.g., see FIG. 4). Of course, it is contemplated the intermittent combustion engine 68 may alternatively be naturally aspirated where the aircraft 20 is not designed for high altitude missions.

Figure 3:
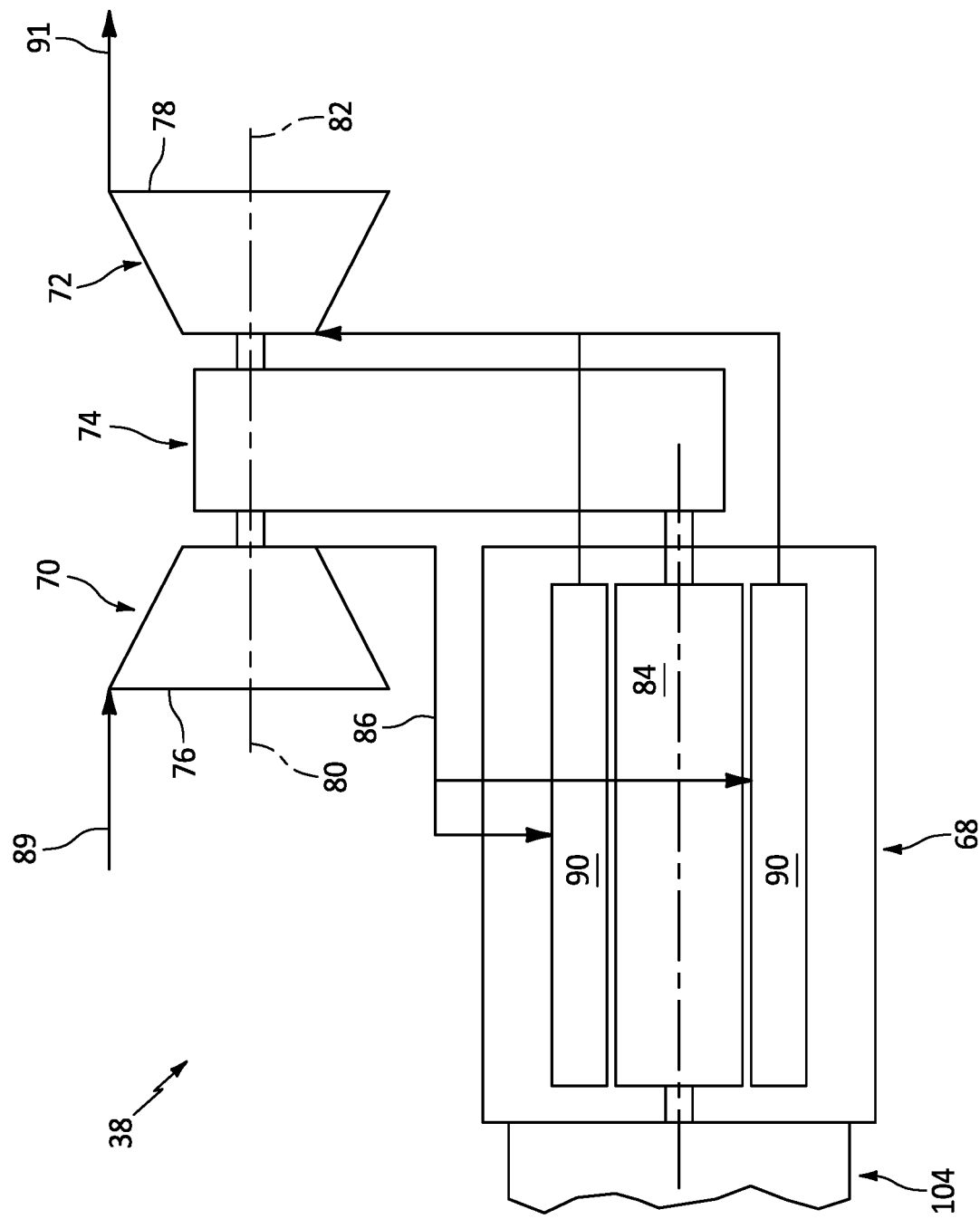
FIG. 3 is a schematic illustration of an aircraft powerplant coupled to a gearbox, where the aircraft powerplant is configured as a turbo-compounded intermittent combustion engine.

FIG. 3 illustrates the intermittent combustion engine 68 as a turbo-compounded intermittent combustion engine. The aircraft powerplant 38 of FIG. 3, in particular, includes the intermittent combustion engine 68, a compressor section 70, a turbine section 72 and a gearbox 74. The compressor section 70 includes a bladed compressor rotor 76 and the turbine section 72 includes a bladed turbine rotor 78. Each of these bladed rotors 76, 78 includes a plurality of rotor blades arranged circumferentially around and connected to one or more respective rotor disks. The compressor rotor 76 is rotatable about a compressor axis 80. The turbine rotor 78 is rotatable about a turbine axis 82, which turbine axis 82 may be parallel (e.g., coaxial) with the compressor axis 80. The turbine rotor 78 is coupled to the compressor rotor 76 through the gearbox 74; however, the turbine rotor 78 may alternatively be coupled directly to the compressor rotor 76 by a common shaft. The turbine rotor 78 is further coupled to an internal rotating structure 84 of the intermittent combustion engine 68 through the gearbox 74.

Figure 4:
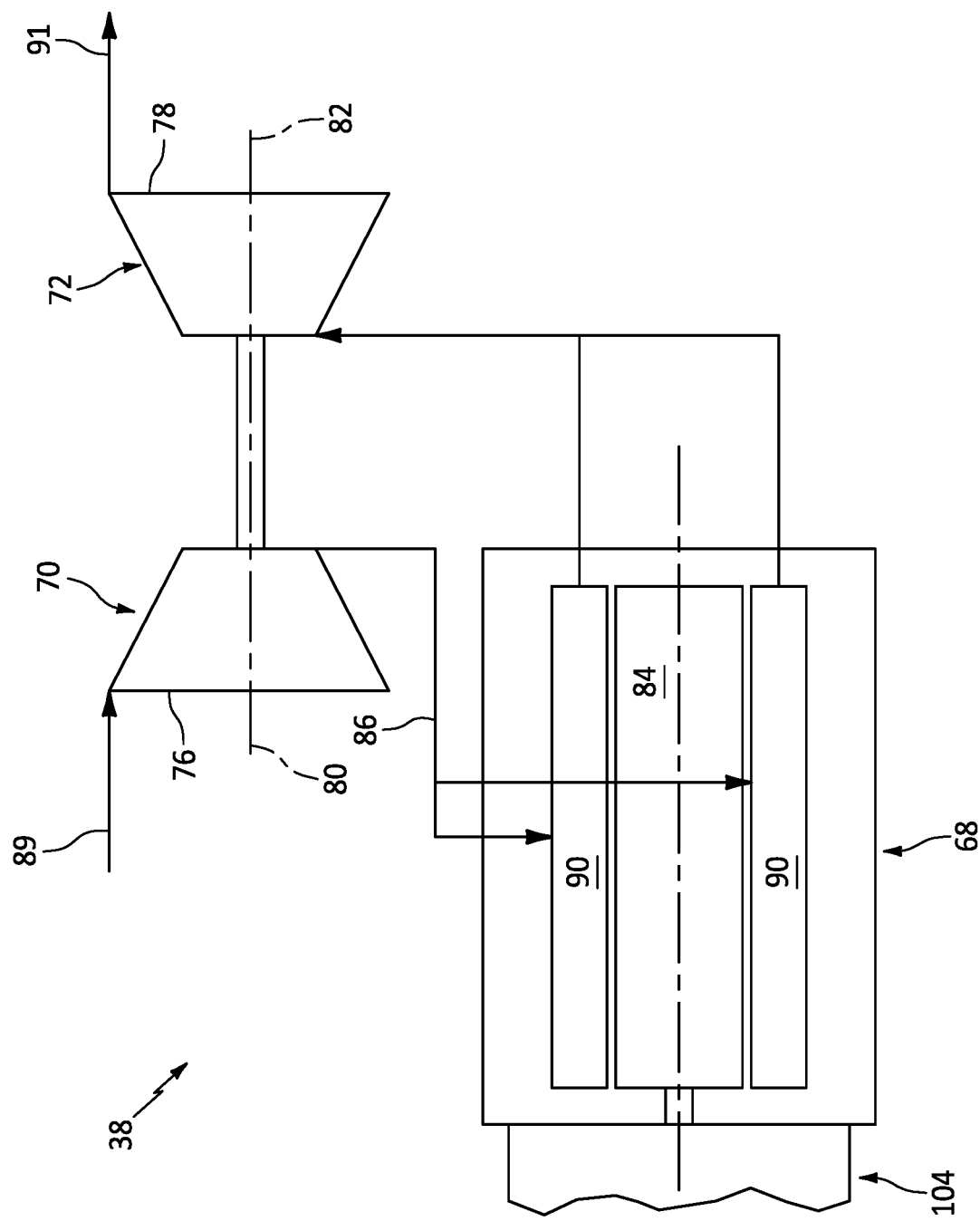
FIG. 4 is a schematic illustration of the aircraft powerplant coupled to the gearbox, where the aircraft powerplant is configured as a turbocharged intermittent combustion engine.

The aircraft powerplant 38 of FIG. 3 (e.g., the turbo-compounded intermittent combustion engine of FIG. 3, the turbocharged intermittent combustion engine of FIG. 4) includes an internal powerplant flowpath 86. This powerplant flowpath 86 is discrete (e.g., separate, fluidly decoupled, etc.) from propulsor flowpaths 88 (e.g., 88A, 88B) through the respective flow ducts 50 of FIG. 2. The powerplant flowpath 86 of FIG. 3 extends from an inlet 89 to the aircraft powerplant 38, sequentially through the compressor section 70, one or more combustion zones 90 (e.g., cylinder chambers, etc.) within the intermittent combustion engine 68 and the turbine section 72, to an exhaust 91 from the aircraft powerplant 38. With this arrangement, the air delivered to the intermittent combustion engine 68 is compressed by the compressor rotor 76, and combustion products produced by combustion of the air-fuel mixture within the combustion zone(s) 90 drives rotation of the turbine rotor 78. The rotation of the turbine rotor 78 drives rotation of the compressor rotor 76 to facilitate the compression of the incoming air to the intermittent combustion engine 68. The rotation of the turbine rotor 78 may also assist driving rotation of the rotating structure 84.

Referring to FIG. 2, the aircraft powerplant 38 and its intermittent combustion engine 68 are arranged remote from the aircraft propulsors 36. The aircraft powerplant 38, for example, may be arranged inside of the airframe 22. More particularly, the aircraft powerplant 38 and its intermittent combustion engine 68 of FIG. 2 are arranged within the fuselage 26, for example at (e.g., on, adjacent or proximate) an aft, tail end 92 of the fuselage 26 proximate the vertical stabilizer 30 (see FIG. 1). Arranging the aircraft powerplant 38 and its intermittent combustion engine 68 within the airframe 22 takes advantage of available interior space within the aircraft 20 such that the aircraft powerplant 38 does not need to be located outside of the airframe 22 (e.g., like the aircraft propulsors 36) and thereby add to aircraft drag. Furthermore, arranging the aircraft powerplant 38 and its intermittent combustion engine 68 remote form the aircraft propulsors 36 may facilitate reducing overall sizes of the aircraft propulsors 36 and/or increase flow area of each duct 50 (e.g., compared to a turbofan engine with an integral inner core).

The powerplant inlet 89 is configured to draw fresh air from an exterior environment outside of the aircraft 20. The powerplant inlet 89 of FIG. 2, for example, includes/is formed by one or more inlet scoops 94 (e.g., 94A, 94B). Each of these inlet scoops 94 may be arranged along an exterior of the fuselage 26. Each of the inlet scoops 94 (and the powerplant inlet 89 more generally) may thereby direct boundary layer air flowing along the fuselage 26 into the aircraft powerplant 38. Utilizing this boundary layer air may also improve aerodynamics of the fuselage 26.

The powerplant exhaust 91 is configured to direct the combustion products out of the aircraft powerplant 38 and out of the aircraft 20. The powerplant exhaust 91 of FIG. 2, for example, includes an exhaust nozzle 96 along the exterior of the fuselage 26 at, for example, the aft end 92 of the fuselage 26. Positioning the exhaust nozzle 96 at the aft end 92 may reduce aircraft drag and may thereby improve aircraft powerplant efficiency and/or power. In some embodiments, the combustion products may be ducted directly from the turbine section 72 to the exhaust nozzle 96; e.g., where the exhausted combustion products are un-muffled. In other embodiments, at least one muffler 98 may be located between and fluidly coupled with the turbine section 72 and the exhaust nozzle 96. With this arrangement, the exhausted combustion products are muffled before being directed into the exterior environment outside of the aircraft 20.

Figure 5:
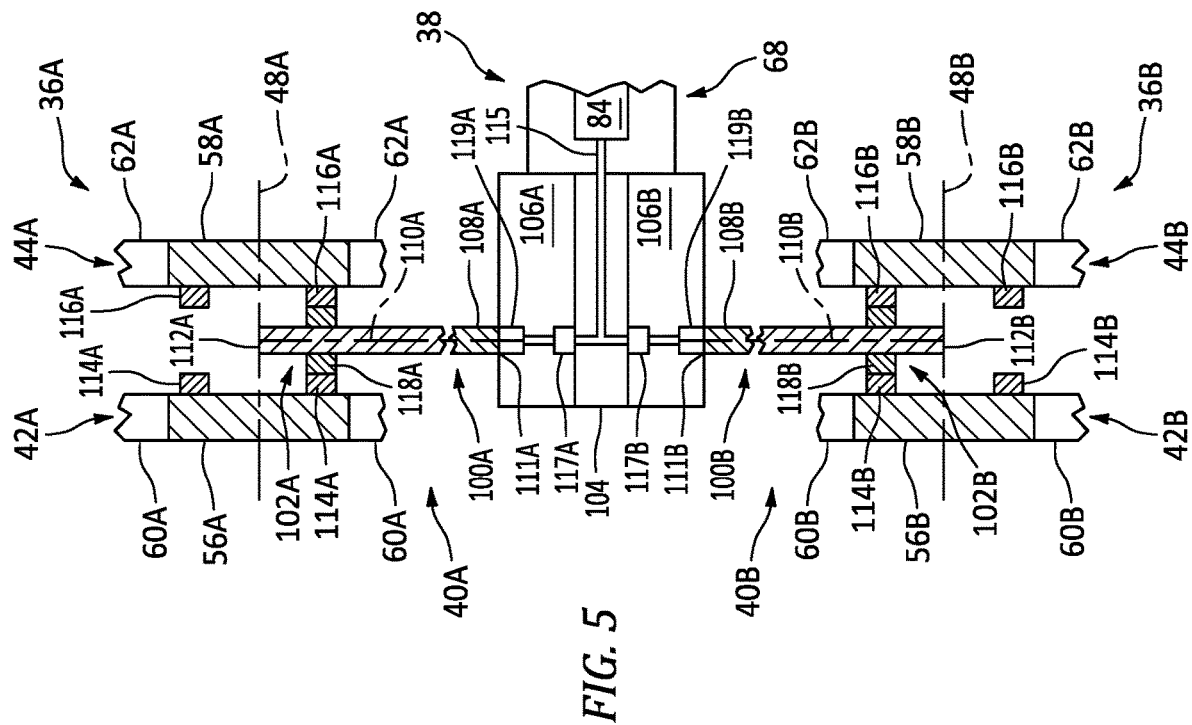
FIG. 5 is a sectional schematic illustration of a drivetrain coupling a plurality of aircraft propulsors with the aircraft powerplant.

Referring to FIG. 5, the first propulsor drivetrain 40A is configured to operatively couple the rotating structure 84 to the propulsor rotors 42A and 44A. Similarly, the second propulsor drivetrain 40B is configured to operatively couple the rotating structure 84 to the propulsor rotors 42B and 44B. With this arrangement, rotation of the rotating structure 84, driven by combustion of the fuel-air mixture within the combustion zone(s) 90 (see FIGS. 3 and 4), may drive rotation of the propulsor rotors 42 and 44. Each propulsor drivetrain 40A, 40B of FIG. 5 includes a drive structure 100 (e.g., 100A, 100B), a propulsor coupling 102 (e.g., 102A, 102B) and a powerplant transmission 106 (e.g., 106A, 106B), where each powerplant transmissions 106A, 106B may be coupled to the aircraft powerplant 38 by a transmission gearbox 104.

Each of the drive structures 100A, 100B of FIG. 5 is configured as a driveshaft 108 (e.g., 108A, 108B). Each driveshaft 108A, 108B extends axially along a drive axis 110 (e.g., 110A, 110B) from a transmission end 111 (e.g., 111A, 111B) of the respective drive structure 100A, 100B to a coupling end 112 (e.g., 112A, 112B) of the respective drive structure 100A, 100B. Each drive axis 110A, 110B of FIG. 5 is angularly offset from the propulsor axes 48. The drive axes 110, for example, may be perpendicular to the propulsor axes 48.

The first propulsor coupling 102A is configured to connect the first drive structure 100A and its driveshaft 108A to one or more of the propulsor rotors 42A and 44A in the first aircraft propulsor 36A. The second propulsor coupling 102B is configured to connect the second drive structure 100B and its driveshaft 108B to one or more of the propulsor rotors 42B and 44B in the second aircraft propulsor 36B. Each of these propulsor couplings 102A, 102B includes one or more ring gears 114 (e.g., 114A, 114B) and 116 (e.g., 116A, 116B) and a pinion gear 118 (e.g., 118A, 118B). Each of the ring gears 114, 116 is mounted to or otherwise connected to and rotatable with a respective one of the propulsor rotors 42 and 44. The pinion gear 118 is mounted to or otherwise connected to and rotatable with a respective one of the drive structures 100 and its driveshaft 108 at a respective end 112. This pinion gear 118 is engaged (e.g., meshed) with the respective ring gears 114, 116. The pinion gear 118 is also located between the respective ring gears 114, 116. With this arrangement, rotating the pinion gear 118 may rotate the first ring gear 114 and, thus, the first propulsor rotor 42 in the first direction and may rotate the second ring gear 116 and, thus, the second propulsor rotor 44 in the second direction.

Figure 10:
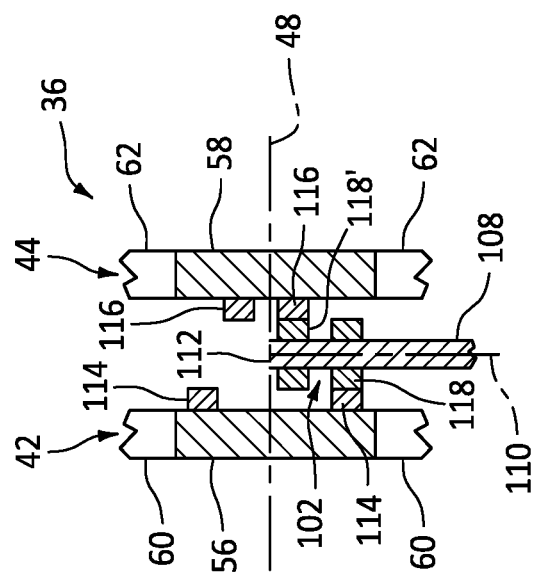
FIG. 10 is a sectional schematic illustration of a portion of the drivetrain with multiple pinion gears for a common propulsor.

In some embodiments, each propulsor coupling 102 may be configured such that the respective propulsor rotors 42 and 44 rotate at a common (e.g., the same) rotational speed. In other embodiments, each propulsor coupling 102 may be configured such that respective propulsor rotors 42 and 44 rotate at different rotational speeds. The second propulsor rotor 44, for example, may rotate at a faster rotational speed than the first propulsor rotor 42. This speed differential may be tuned to account for the second propulsor rotor 44 receiving higher speed air than the first propulsor rotor 42. To provide such a speed differential, the ring gears 114 and 116 may have different diameters and each ring gear 114, 116 may engage (e.g., mesh with) its own pinion gear 118, 118'; e.g., see FIG. 10. The separate pinion gears 118 and 118' of FIG. 10 may also have different diameters.

Referring to FIG. 5, the transmission gearbox 104 is configured to couple each of the powerplant transmissions 106 (e.g., in parallel, independently, etc.) to the aircraft powerplant 38. More particularly, the transmission gearbox 104 is configured to connect an output 115 from the intermittent combustion engine 68 and its rotating structure 84 to respective inputs 117 (e.g., 117A, 117B) of the powerplant transmissions 106A and 106B. Of course, in other embodiments, the functionality of this transmission gearbox 104 may be incorporated into one or both of the powerplant transmissions 106A, 106B and the gearbox 104 may be omitted.

Each of the powerplant transmissions 106A, 106B includes its transmission input 117A, 117B and a transmission output 119 (e.g., 119A, 119B). Each transmission 106A, 106B is configured such that a rotational speed of the transmission input 117A, 117B may be different than a rotational speed of the transmission output 119A, 119B. Each transmission 106A, 106B may also be configured such that a speed ratio between its transmission input speed and its transmission output speed may change. Thus, each transmission 106A, 106B may be a variable speed transmission. Examples of the variable speed transmission include, but are not limited to, a continuously variable transmission (CVT) and a variable speed drive (VSD). However, where one or more or all of the rotor blades 60, 62 of the respective propulsor rotor 42, 44 are variable pitch rotor blades, each transmission 106A, 106B may alternatively be configured as a fixed speed transmission; e.g., a non-variable speed transmission.

Each transmission input 117A, 117B is coupled to, is rotatable with and is rotationally driven by the powerplant rotating structure 84 through the transmission gearbox 104. Each transmission output 119A, 119B is coupled to, is rotatable with and drives rotation of the propulsor rotors 42 and 44 through the respective drivetrain elements 100A, 100B and 102A, 102B. With this arrangement, mechanical power output by the aircraft powerplant 38 is transferred to the aircraft propulsor 36A and its propulsor rotors 42A and 44A through the first transmission 106A; e.g., independent of the second transmission 106B and the associated second drivetrain 40B. Similarly, mechanical power output by the aircraft powerplant 38 is transferred to the aircraft propulsor 36B and its propulsor rotors 42B and 44B through the second transmission 106B; e.g., independent of the first transmission 106A and the associated first drivetrain 40A.

To facilitate high speed aircraft flight, each transmission 106A, 106B may change the speed ratio in a first direction; e.g., increase (or decrease) the speed ratio. To facilitate low speed aircraft flight, each transmission 106A, 106B may change the speed ratio in an opposite second direction; e.g., decrease (or increase) the speed ratio. More particularly, each transmission 106A, 106B may be operable to increase or decrease the propulsor rotor speed without significantly changing a rotational speed of the powerplant rotating structure 84. The aircraft powerplant 38 and its intermittent combustion engine 68 may thereby operate (e.g., throughout aircraft flight) at a certain rotational speed (or within a relatively small rotational speed band), while facilitating rotation of the propulsor rotors 42 and 44 within a relatively large rotational speed band. In other words, while the aircraft powerplant 38 and its intermittent combustion engine 68 may be substantially continuously operated at a certain (e.g., maximum) power and/or efficiency, the thrust produced by the aircraft propulsors 36A, 36B may be adjusted and variable, individually or together. This thrust may also be adjusted by adjusting pitch of one or more or all of the rotor blades 60A, 60B, 62A, 62B.

Including a separate transmission 106 for each drive structure 100 and, thus, each aircraft propulsor 36 facilitates a capability of providing a thrust differential across the aircraft 20. The first powerplant transmission 106A, for example, may facilitate rotation of the propulsor rotors 42A and 44A to provide first thrust, whereas the second powerplant transmission 106B may independently facilitate rotation of the propulsor rotors 42B and 44B to provide second thrust that is different (e.g., less or greater) than the first thrust. Of course, during other modes of operation, the powerplant transmissions 106A and 106B may be operated such that the propulsor rotors 42A and 44A and the propulsor rotors 42B and 44B provide the same amount of thrust; e.g., matching thrust. Including the separate powerplant transmissions 106 may also provide redundancy in an unlikely event that operation of one of the propulsors 36 (e.g., rotation of the propulsor rotors 42 and 44) needs to be terminated or otherwise changed for non-nominal operation.

Each of the transmissions 106 of FIG. 2 is arranged remote from the aircraft propulsors 36. The transmissions 106 of FIG. 2, for example, are arranged with the aircraft powerplant 38 within the fuselage 26. Like the aircraft powerplant 38, arranging the transmissions 106 within the aircraft fuselage 26 takes advantage of available space without increased aircraft drag.

Figure 6:
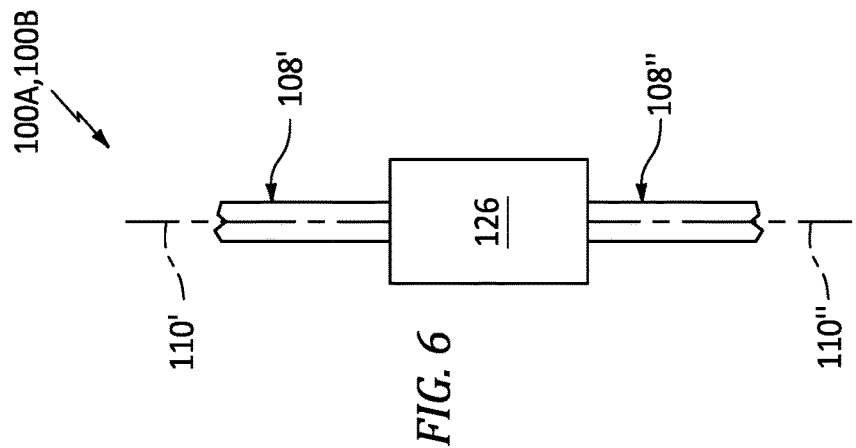
FIG. 6 is a schematic illustration of a compliant coupling between two driveshafts.

In some embodiments, referring to FIG. 5, each drive structure 100A, 100B may be configured as a single, continuous driveshaft 108A, 108B. In other embodiments, referring to FIG. 6, one or all of the drive structures 100 may each include at least one compliant coupling 126 (or multiple compliant couplings); e.g., flex joints. The drive structure 100 of FIG. 6, for example, includes a plurality of driveshafts 108 (e.g., 108' and 108"); e.g., drive structure segments. The first driveshaft 108' is connected to the second driveshaft 108" through the compliant coupling 126. This compliant coupling 126 may facilitate axial movement between the driveshafts 108 along the drive axes 110 (e.g., 110' and 110"). The compliant coupling 126, for example, may be configured as or otherwise include a spline joint. The compliant coupling 126 may also or alternatively facilitate angular misalignment (e.g., slight pivoting) between the driveshafts 108. The compliant coupling 126, for example, may also or alternatively be configured as or otherwise include a universal joint. With such an arrangement, the drive structure 100 may accommodate slight flexing within the airframe 22 and/or between the airframe 22 and the aircraft propulsors 36.

Figure 7:
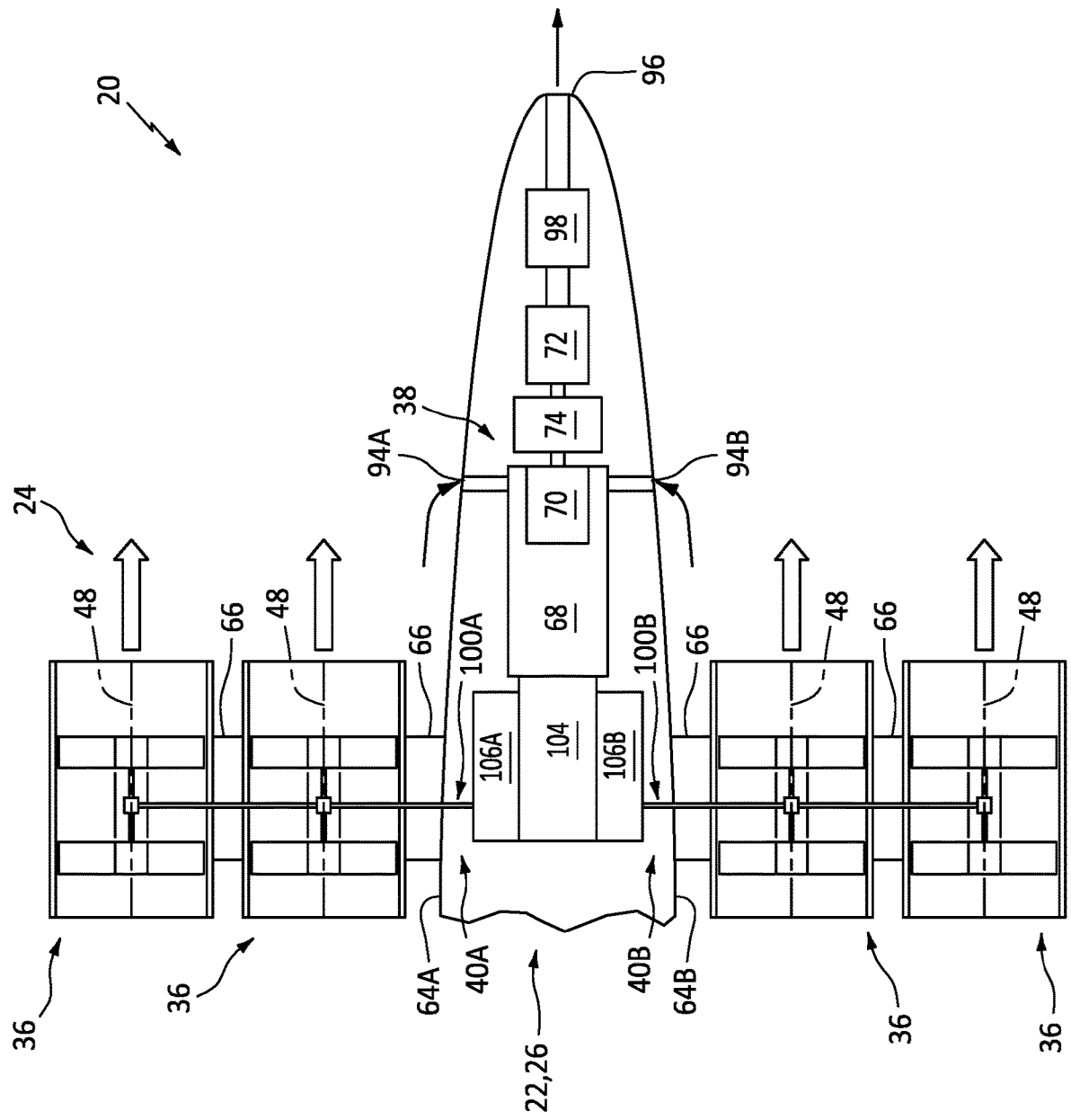
FIG. 7 is a schematic illustration of the aft end portion of the aircraft configured with additional aircraft propulsors.

In some embodiments, referring to FIG. 2, the aircraft propulsion system 24 may be configured with a single aircraft propulsor 36 to each (or at least one) lateral side 64 of the airframe 22 and its fuselage 26. With this arrangement, the aircraft powerplant 38 and its intermittent combustion engine 68, the transmissions 106 as well as the airframe 22 and its fuselage 26 may be located laterally between the aircraft propulsors 36 and their respective propulsor axes 48. In other embodiments, referring to FIG. 7, the aircraft propulsion system 24 may be configured with multiple aircraft propulsors 36 to each (or at least one) lateral side 64 of the airframe 22 and its fuselage 26. With this arrangement, a plurality of the aircraft propulsors 36 and their respective propulsor axes 48 may be located laterally to the first side 64A of the aircraft powerplant 38 and its intermittent combustion engine 68, the transmissions 106 as well as the airframe 22 and its fuselage 26. Similarly, a plurality of the aircraft propulsors 36 and their respective propulsor axes 48 may also or alternatively be located laterally to the second side 64B of the aircraft powerplant 38 and its intermittent combustion engine 68, the transmissions 106 as well as the airframe 22 and its fuselage 26.

Figure 8:
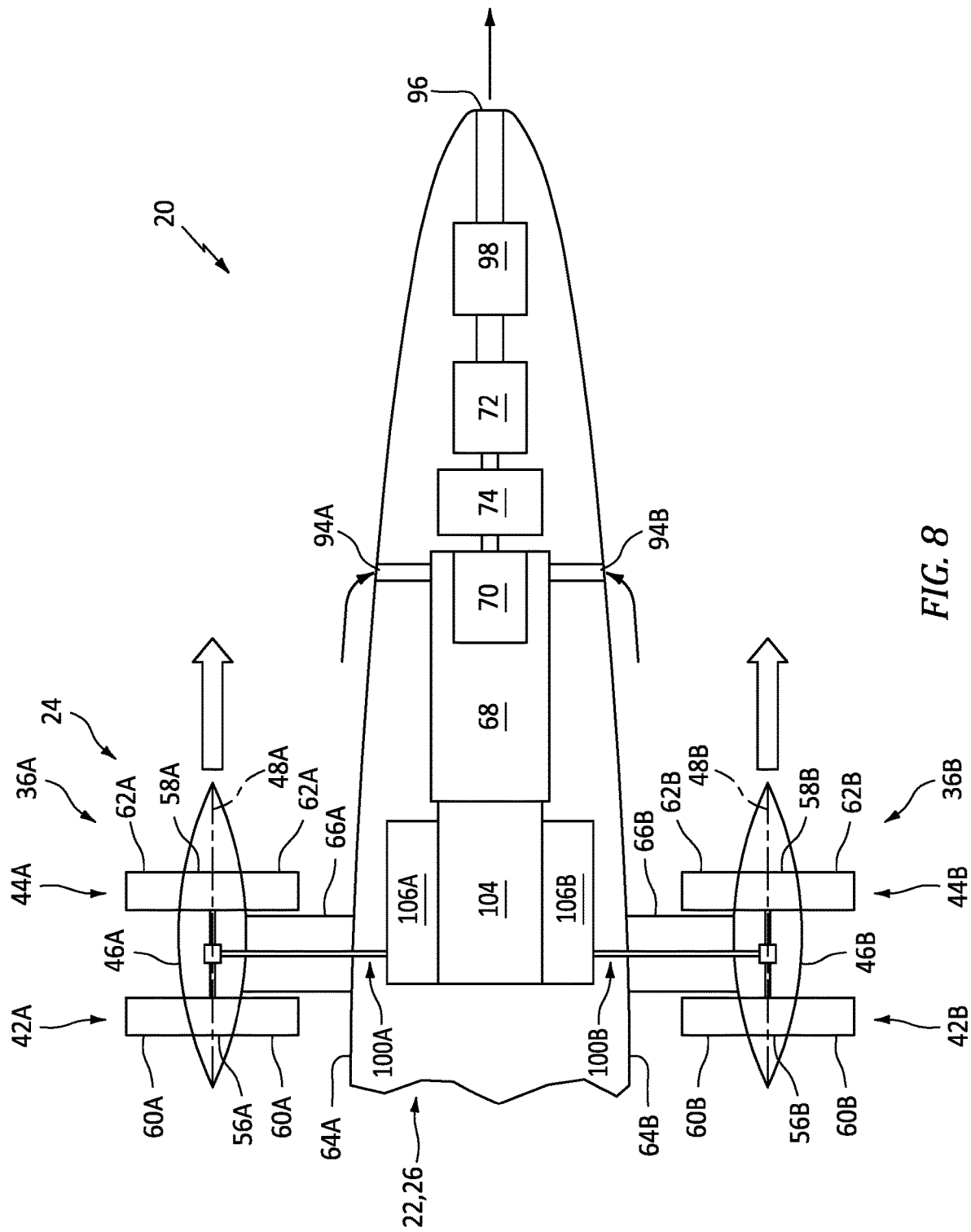
FIG. 8 is a schematic illustration of the aft end portion of the aircraft configured with open rotor propulsors.

In some embodiments, referring to FIG. 2, the propulsor rotors 42 and 44 may be configured as ducted rotors; e.g., fan rotors. In other embodiments, referring to FIG. 8, the propulsor rotors 42 and 44 may alternatively be configured as open rotors (e.g., propellers) where, for example, the respective aircraft propulsor 36 is configured without the propulsor housing 46 of FIG. 2.

Figure 9:
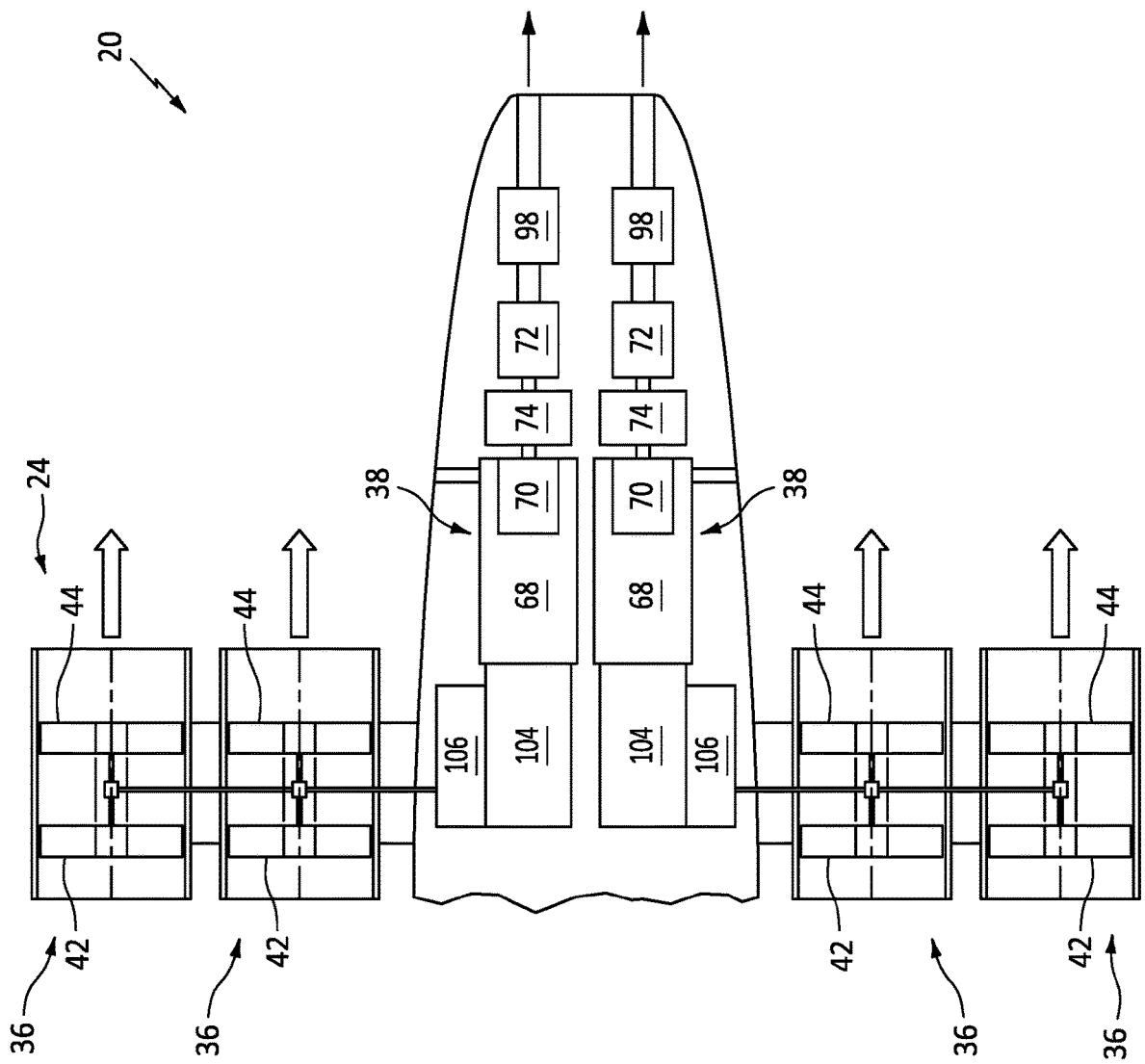
FIG. 9 is a schematic illustration of the aft end portion of the aircraft configured with a plurality of the aircraft powerplants, where each aircraft powerplant powers its own aircraft propulsor(s).

In some embodiments, referring to FIG. 2, the propulsion system 24 may include a single aircraft powerplant 38 powering all of the aircraft propulsors 36. In other embodiments, referring to FIG. 9, the propulsion system 24 may include multiple of the aircraft powerplants 38, where each aircraft powerplant 38 is paired with and powers its own aircraft propulsor(s) 36 through a single transmission 106. Such an arrangement may also be provided to facilitate provision of the thrust differential laterally across the aircraft 20.

The propulsion system elements 38 and 106 are described above as being located in and mounted with the aft end region 34 of the fuselage 26. The present disclosure, however, is not limited to such an exemplary arrangement. For example, one or more or all of the propulsion system elements 38 and 106 may alternatively be located with and mounted to an intermediate or forward region of the fuselage 26. In still another example, one or more or all of the propulsion system elements 38 and 106 may be located within and mounted with another structure of the airframe 22 besides the fuselage 26; e.g., a pylon, one of the wings 28, one of the stabilizers 30, 32, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An aircraft system, comprising:
a first propulsor rotor rotatable about a first propulsor axis;
a first transmission coupled to the first propulsor rotor;
a second propulsor rotor rotatable about a second propulsor axis;
a second transmission coupled to the second propulsor rotor, the second transmission different from and independent of the first transmission; and
an intermittent combustion engine configured to drive rotation of the first propulsor rotor through the first transmission, and the intermittent combustion engine configured to drive rotation of the second propulsor rotor through the second transmission independent of the rotation of the first propulsor rotor,
wherein the first transmission and the second transmission are configured to facilitate rotation of the first propulsor rotor and the second propulsor rotor at different rotational speeds during at least one mode of operation.

2. The aircraft system of claim 1, further comprising:
a third propulsor rotor downstream of the first propulsor rotor and rotatable about the first propulsor axis; the intermittent combustion engine further configured to drive rotation of the third propulsor rotor through the first transmission.

3. The aircraft system of claim 2, further comprising:
a first propulsor ring gear rotatable with the first propulsor rotor;
a third propulsor ring gear rotatable with the third propulsor rotor; and
a pinion gear rotatably driven by the intermittent combustion engine through the first transmission, the pinion gear meshed with the first propulsor ring gear and the third propulsor ring gear.

4. The aircraft system of claim 2, further comprising:
a first propulsor ring gear rotatable with the first propulsor rotor;

a third propulsor ring gear rotatable with the third propulsor rotor;
a first pinion gear rotatably driven by the intermittent combustion engine through the first transmission, the first pinion gear meshed with the first propulsor ring gear; and
a second pinion gear rotatably driven by the intermittent combustion engine through the first transmission, the second pinion gear meshed with the third propulsor ring gear.

5. The aircraft system of claim 2, further comprising:
a drivetrain coupling the intermittent combustion engine to the first propulsor rotor and the third propulsor rotor;
the drivetrain configured to rotate the first propulsor rotor and the third propulsor rotor in opposite directions; and
the drivetrain comprising the first transmission.

6. The aircraft system of claim 1, further comprising:
a first drive structure coupling the first transmission to the first propulsor rotor; and
a first coupling connecting the first drive structure to the first propulsor rotor, the first coupling including a first propulsor ring gear and a first pinion gear, the first propulsor ring gear rotatable with the first propulsor rotor, and the first pinion gear rotatable with the first drive structure and meshed with the first ring gear.

7. The aircraft system of claim 6, wherein the first drive structure is configured as a driveshaft.

8. The aircraft system of claim 1, further comprising:
an aircraft fuselage housing the intermittent combustion engine, the first transmission and the second transmission;
the first propulsor rotor and the second propulsor rotor located outside of the aircraft fuselage.

9. The aircraft system of claim 8, further comprising:
an inlet configured to direct boundary layer air flowing along the aircraft fuselage to the intermittent combustion engine; and
an exhaust located at an aft end of the aircraft fuselage, the exhaust configured to direct combustion products generated by the intermittent combustion engine out of the aircraft system.

10. The aircraft system of claim 1, wherein, during at least a second mode of operation, the first transmission and the second transmission are configured to facilitate rotation of the first propulsor rotor and the second propulsor rotor at a common rotational speed.

11. The aircraft system of claim 1, wherein
the first propulsor rotor comprises a first ducted rotor; and
the second propulsor rotor comprises a second ducted rotor.

12. The aircraft system of claim 1, wherein
the first propulsor rotor comprises a first open rotor; and
the second propulsor rotor comprises a second open rotor.

13. The aircraft system of claim 1, wherein
the first propulsor axis is laterally spaced from the second propulsor axis; and
the intermittent combustion engine is located laterally between the first propulsor axis and the second propulsor axis.

14. The aircraft system of claim 1, wherein the first transmission comprises a variable speed transmission.

15. The aircraft system of claim 1, wherein the intermittent combustion engine comprises one of a rotary engine, a piston engine, a rotating detonation engine or a pulse detonation engine.

16. The aircraft system of claim 1, wherein the intermittent combustion engine comprises a turbo-compounded intermittent combustion engine or a turbocharged intermittent combustion engine.

17. An aircraft system, comprising:
a first propulsor including a plurality of first propulsor rotors rotatable about a first propulsor axis;
a first transmission coupled to the plurality of first propulsor rotors;
a second propulsor including a plurality of second propulsor rotors rotatable about a second propulsor axis;
a second transmission coupled to the plurality of second propulsor rotors, the second transmission different from and independent of the first transmission;
a powerplant comprising an intermittent combustion engine configured to drive rotation of the plurality of first propulsor rotors through the first transmission, and the intermittent combustion engine configured to drive rotation of the plurality of second propulsor rotors through the second transmission,
wherein:
at least one propulsor rotor from among the plurality of first propulsor rotors rotates in an opposite direction than a remainder of the plurality of first propulsor rotors,
at least one propulsor rotor from among the plurality of second propulsor rotors rotates in an opposite direction than a remainder of the plurality of second propulsor rotors,
the aircraft system is configured such that a mechanical power output by the powerplant is transferred to the first propulsor through the first transmission independent of the second transmission, and
the first transmission and the second transmission are configured to facilitate rotation of the plurality of first propulsor rotors and the plurality of second propulsor rotors at different rotational speeds during at least one mode of operation.

18. The aircraft system of claim 17, wherein
the first transmission is configured as a first variable speed transmission; and
the second transmission is configured as a second variable speed transmission.

19. An aircraft system, comprising:
an aircraft fuselage;
a first propulsor outside of and next to the aircraft fuselage, the first propulsor comprising a ducted propulsor rotor;
a second propulsor outside of and next to the aircraft fuselage, the second propulsor comprising a ducted propulsor rotor;
a first transmission housed within the aircraft fuselage, the first transmission coupled to the first propulsor;
a second transmission housed within the aircraft fuselage, the second transmission coupled to the second propulsor, the second transmission different from and independent of the first transmission; and
a turbo-compounded intermittent combustion engine housed within the aircraft fuselage, the turbo-compounded intermittent combustion engine configured to drive rotation of the first ducted propulsor rotor through the first transmission, and the turbo-compounded intermittent combustion engine configured to drive rotation of the second ducted propulsor rotor through the second transmission.

* * * * *